March 29, 1927.

W. A. MIELKE

TIRE SPREADER

Filed July 15, 1926

1,622,661

Inventor
W. A. Mielke

By Watson E. Coleman
Attorney

Patented Mar. 29, 1927.

1,622,661

UNITED STATES PATENT OFFICE.

WILLIAM A. MIELKE, OF BANCROFT, NEBRASKA.

TIRE SPREADER.

Application filed July 15, 1926. Serial No. 122,645.

This invention relates to tire spreaders and more particularly to a device for spreading the beads of a tire, so as to permit ready inspection of the interior of the tire or to maintain the tire in proper position for the performance of any desired operation upon the interior thereof.

An important object of the invention is to produce a device of this character which is readily applied to the tire and which, after being applied to the tire, may be readily shifted circumferentially of the tire, thus assisting in an inspection of the tire, for the purpose of locating a puncturing element which is projecting into the interior of the casing.

A further object of the invention is to provide a device of this character which is readily adjustable to permit its adaptation to tires of different size.

These and other objects I attain by the construction shown in the accompanying drawing, wherein for the purpose of illustration is shown a preferred embodiment of my invention and wherein:—

Figure 1:
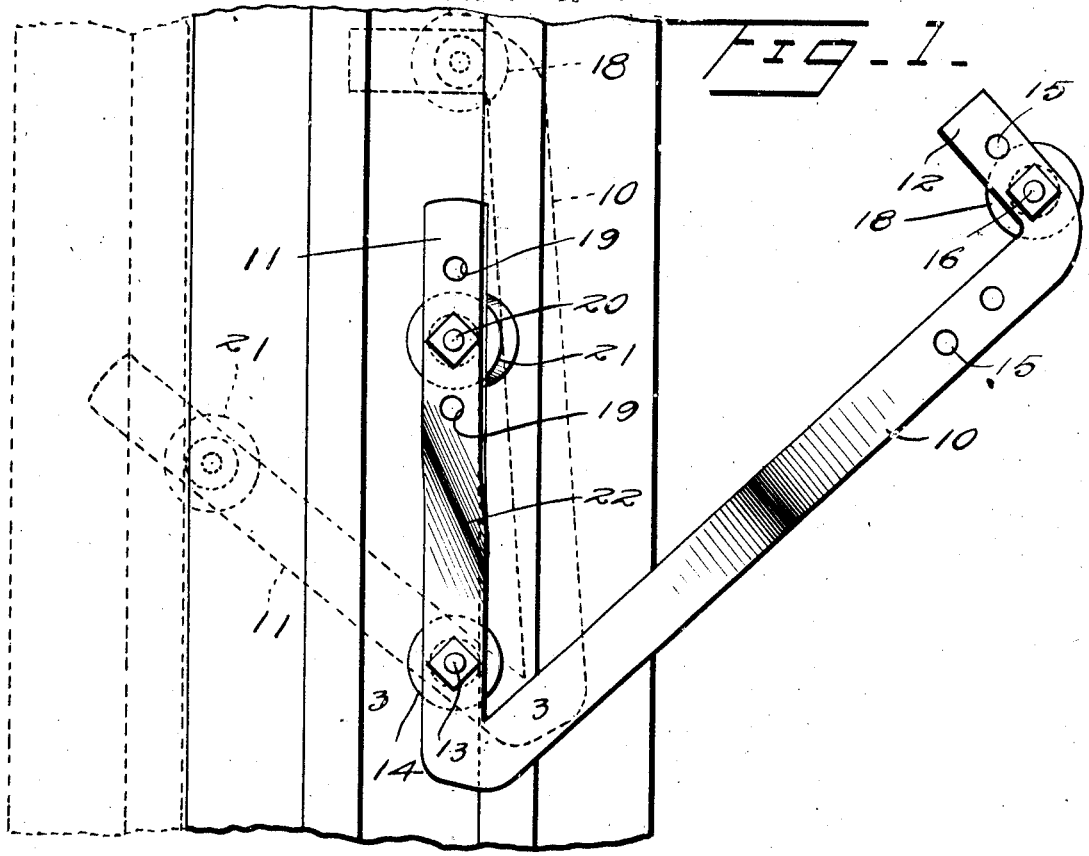
Figure 1 is a side elevation of a fragment of a tire showing a tire spreader constructed in accordance with my invention applied thereto ready to spread the tire in solid lines, the dotted lines indicating the position of the spreader and tire when the spreader is in operative position.
Figure 2:
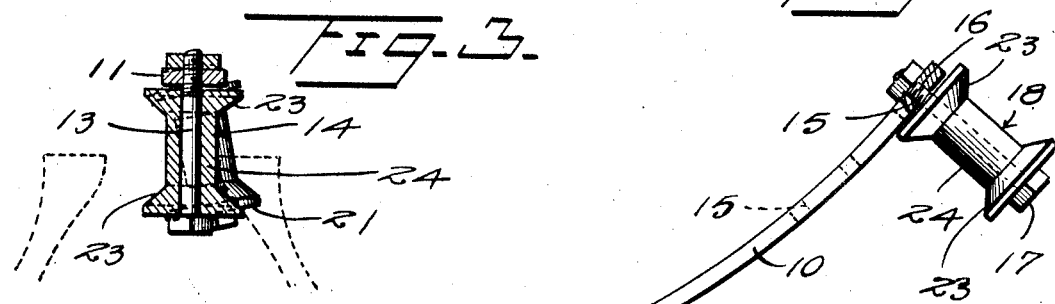
Figure 2 is a side elevation partially in section of the spreader.
Figure 3:
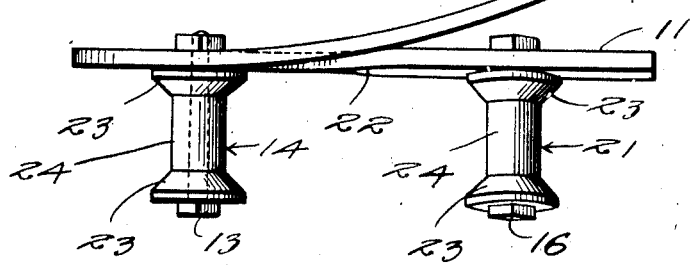
Figure 3 is a sectional view through the short arm of the spreader.

Referring now more particularly to the drawing, the spreader consists of a bar bent to form two arms 10 and 11 arranged at an acute angle to one another. These arms will be hereinafter referred to as the long and short arms respectively. The end of the long arm has an angular extension 12. The long arm is longitudinally arcuately curved, so that it approximates in curvature the curvature of the interior or bead face of a tire. Adjacent the bight between the arms, the short arm has applied thereto a pivot bearing 13 projecting from one face of the arm and having longitudinally mounted thereon a roller 14. The long arm, adjacent its free end and in its angular extension 12, is formed with a series of spaced threaded openings 15 adapted to selectively receive the threaded end 16 of a pivot 17 upon which is mounted a second roller 18. The free end of the short arm is provided with a series of longitudinally spaced threaded openings 19 for the reception of a similar pivot 20 for the reception of a third roller 21. The short arm preferably is given a slight twist intermediate its ends, as indicated at 22, so that the axes of the rollers 14 and 21 are arranged at an angle to one another. Each of the rollers 14, 18 and 21 is spool-like having at its ends flanges 23, the inner faces of which taper to the body 24 of the spool.

In the use of the device, the rollers 14 and 21 are inserted between the beads of the tire by aligning the short arm with the tire and when these rollers are in position between the beads, the long arm is employed as a lever and forced toward the slot between the beads until its roller 18 can be engaged in the slot. This action will cause the rollers 14 and 21 to spread the beads of the tire, causing the same to separate and the roller 18 will, of course, hold the arms and rollers in their proper position. By curving the arm 11, the rollers may be caused to arrange themselves approximately radially to the tire casing, so that the friction between the rollers and the edges of the beads, when the spreader, after application, is shifted circumferentially of the tire, is materially reduced. By adjusting the pivot 17 of the roller 18 in the openings 15, the degree to which the tire is opened may be regulated. This adjustment, together with the adjustment of the roller 21, will permit the device to be arranged for use with tire casings of various sizes. The twist applied to the short arm intermediate the ends thereof causes the tire casing to center upon the rollers instead of shift toward one end thereof as would be the tendency were the faces of these rollers parallel to one another.

Since the construction hereinbefore set forth is capable of a certain range of change and modification without materially departing from the spirit of the invention, I do not limit myself to such specific structure except as hereinafter claimed.

I claim:—

1. A tire spreader comprising short and long arms arranged at an acute angle to one another and rigidly connected, the long arm being arcuately curved to approximate the curvature of the bead face of a tire, pivots projecting from corresponding faces of the free ends of the long and short arms, a further pivot mounted adjacent the connection between the arms and at the same side of the arms and rollers mounted upon said pivots for engagement with the bead of the tire.

2. A tire spreader comprising short and long arms arranged at an acute angle to one another and rigidly connected, the long arm being arcuately curved to approximate the curvature of the bead face of a tire, pivots projecting from corresponding faces of the free ends of the long and short arms, a further pivot mounted adjacent the connection between the arms and at the same side of the arms and rollers mounted upon said pivots for engagement with the beads of the tire, the first named pivots being adjustable longitudinally of the arms.

3. A tire spreader comprising short and long arms arranged at an acute angle to one another and rigidly connected, the long arm being arcuately curved to approximate the curvature of the bead face of a tire, pivots projecting from corresponding faces of the free ends of the long and short arms, a further pivot mounted adjacent the connection between the arms and at the same side of the arms and rollers mounted upon said pivots for engagement with the beads of the tire, the first named pivots being adjustable longitudinally of the arms, the long arm having an angular extension, the pivot of the free end of the long arm being adjustable longitudinally of the arm and of said extension.

4. A tire spreader comprising short and long arms arranged at an acute angle to one another and rigidly connected, the long arm being arcuately curved to approximate the curvature of the bead face of a tire, pivots projecting from corresponding faces of the free ends of the long and short arms, a further pivot mounted adjacent the connection between the arms and at the same side of the arms and rollers mounted upon said pivots for engagement with the beads of the tire, the last named pivot being mounted upon the short arm, said short arm intermediate the ends thereof having a twist, placing the axes of the rollers thereof at an angle to one another.

In testimony whereof I hereunto affix my signature.

WILLIAM A. MIELKE.